Figure 1:
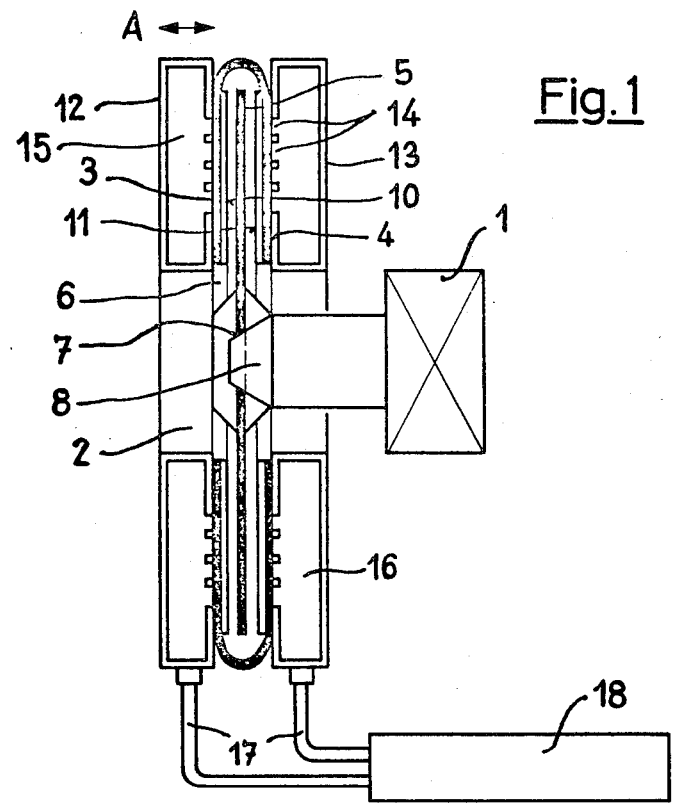

United States Patent [19]

Schoettle et al.

[11] 3,981,025
[45] Sept. 14, 1976

[54] CONTAINER FOR A DISC-SHAPED RECORDING MEDIUM AND A DRIVE UNIT FOR USE THEREWITH

[75] Inventors: Klaus Schoettle, Ludwigshafen; Heinrich Wittkamp, Mannheim; Friedrich Domas, Altlussheim, all of Germany

[73] Assignee: BASF Aktiengesellschaft, Ludwigshafen (Rhine), Germany

[22] Filed: Nov. 21, 1973

[21] Appl. No.: 418,071

[30] Foreign Application Priority Data

Nov. 25, 1972 Germany .................................2257/946

[52] U.S. Cl. ............................... 360/135; 206/444; 346/137; 360/99; 360/133
[51] Int. Cl.² ..................... G11B 25/04; G11B 5/82; G11B 17/28; G11B 3/58
[58] Field of Search ....................... 360/135, 97–99, 360/86, 133; 206/444; 346/137, 131, 122; 220/46 P, 55 MG; 274/47 R

[56] References Cited
UNITED STATES PATENTS

| | | | |
|---|---|---|---|
| 3,060,433 | 10/1962 | Lee, Jr. et al. | 360/99 |
| 3,130,393 | 4/1964 | Gutterman | 360/98 |
| 3,635,608 | 1/1972 | Crouch | 206/444 |
| 3,729,720 | 4/1973 | Darling et al. | 360/135 |

*Primary Examiner*—Alfred H. Eddleman
*Attorney, Agent, or Firm*—Johnston, Keil, Thompson & Shurtleff

[57] ABSTRACT

A container for a disc-shaped recording medium and a drive unit for use with the container, the drive unit being provided with means for increasing the distance between the lower and upper walls of the container, which latter comprises flexible elements. This design permits very high scanning speeds. The container/drive unit combination of the invention can be advantageously employed for recording and/or for reproducing data, video and instrumentation signals.

9 Claims, 6 Drawing Figures

CONTAINER FOR A DISC-SHAPED RECORDING MEDIUM AND A DRIVE UNIT FOR USE THEREWITH

This invention relates to a container for a disc-shaped recording medium and a drive unit for use therewith, the recording medium being rotatable, for the purpose of recording and/or reproducing electrical signals, inside a container at least part of which is locked onto the drive unit, by means of a drive spindle insertable through apertures provided in the container and in the recording medium, at least one scanning member forming part of the said unit being able to approach the surfaces of the recording medium through a slot in the lower and/or upper container walls.

German Published Application No. 2,063,194 discloses a protective cover for a disc-shaped recording medium. The latter can be inserted in a memory processing unit inside its protective cover and, once the protective cover has been locked in position, can be made to engage a rotary drive through a central aperture, the inner surfaces of the protective cover being provided with a low-friction coating for cleaning purposes which continuously maintains mechanical contact with the recording medium while the latter is driven. These cleaning surfaces are intended to constantly clean the disc surfaces, in order to achieve the trouble-free recording and playback of data. This continuous mechanical contact between the cleaning surfaces and the disc surfaces, brought about by a pressure member forming part of the drive unit which slightly compresses the protective cover, reduces the speed of the recording medium to a few hundred revolutions per minute, owing to the friction set up by this arrangement. As a result, the storage capacity and data transfer rate of these known recording media are limited because of the relatively low operating speeds.

An object of the invention is to improve containers and drive units of the type referred to, in order to attain higher storage capacities and data transfer rates and, at the same time, to widen the scope of application.

This object is achieved by a container provided in known manner with flexible portions and a drive unit provided with means for increasing the distance between the inner walls of the container, so that the recording medium, when driven by the drive unit, is rotatable inside the container more or less without making contact with its inner surfaces.

The most important advantage of the invention is that it is possible to raise the speed of rotation of a conventional floppy disc to a maximum of 2000 rpm — a value at which the limit of mechanical stress for the film material is reached. One benefit of this considerable speed increase is a capacity increase in the analog signal recording region, for example in the video range. When recording and playing back digital signals in data processing applications, the speed increase means higher data transfer rates and shorter access times. As a result, recording media of this kind can be employed in data processing generally, and in particular for data acquisition and reading, data communication and transmission and, in smaller installations, also as measured-value, working and program storage devices.

The invention also makes possible the storage of video signals on magnetic and/or grooved tracks and their reproduction with sufficient resolution, for example, on television screens.

In one embodiment of the container of the invention the lower and upper walls are substantially rigid and are connected at the edges by flexible elements.

With such an arrangement it is possible to increase the distance between the inner walls of the container as required by means associated with the drive unit or with the container, so that, in operation, the recording medium can rotate completely freely while being adequately protected from dust. This construction facilitates the locking of the container on the drive unit, for example when only one container wall is retained.

In a further embodiment of the container of the invention, the inner container walls are provided with cleaning surfaces in known manner. In this way it is possible to ensure that the surface of the recording medium is cleaned at least while the container is handled outside the drive unit and while the drive spindle accelerates and decelerates, with the result that perfect trouble-free scanning is guaranteed during recording and playback of the electric signals.

In an advantageous embodiment of the drive unit for use with the container with the recording medium, a vacuum system is provided by means of which a force increasing the distance between the container walls can be applied to the lower and/or upper walls of the container locked on the unit. With such a vacuum system, which may be of relatively simple design, it is easy to achieve the desired speed increase and the attendant advantages.

In another advantageous embodiment of the container and the drive unit according to the invention, apertures are provided in the lower and/or upper container walls in a region of the container outside the periphery of the recording medium and pins are associated with the drive unit which enter the interior of the container through the apertures and bear with their ends on the inner walls of the container opposite the entry apertures when the container is locked on the drive unit, so that the container walls are urged apart.

The required apertures can easily be provided in the container, and the pins associated with the drive unit are similarly inexpensive additions which make the speed increase possible and thus widen the scope of application of the recording medium.

In a further embodiment of the container expanding means, preferably leaf springs, are arranged between the container walls, which expanding means urge the latter apart when the container is locked on the drive unit.

Figure 3:
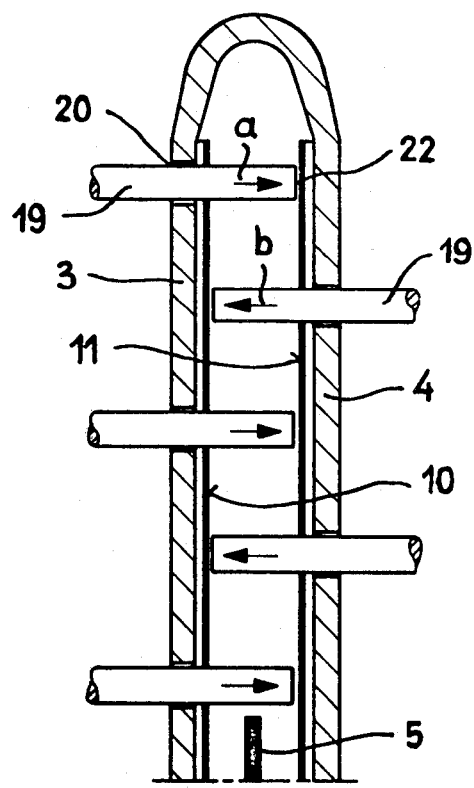
Figure 1A:
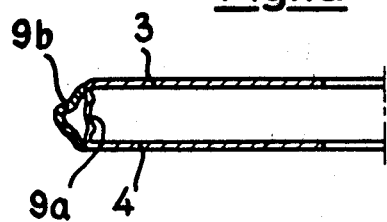
Figure 4:
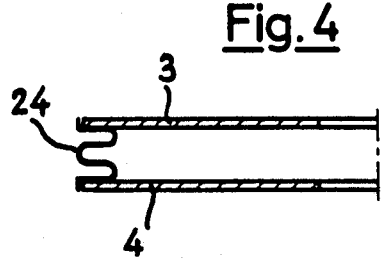

Further details of the invention are disclosed in the following description of the embodiments thereof illustrated in the drawings, in which FIG. 1 is a cross-sectional view of a container with recording medium on a drive unit, with vacuum platens on either side of the container, FIG. 1a, in cross-section, a detail of a container with rigid walls and flexible connecting element, FIG. 2, in plan, a container with entry apertures and expanding pins engaged therein according to the invention, FIG. 3 a cross-sectional view along lines III—III of FIG. 2, FIG. 4, in cross-section, a detail of a container with rigid walls and a resilient lateral connection, and FIG. 5 a detail of the container with a diagrammatically represented scanning element and a cleaning member for the disc moving with the scanning element.

A drive unit 1 for a recording disc 5 capable of rotating inside a container 2 with walls 3 and 4 consists of a diagrammatically represented drive spindle 8 of truncated-cone shape which is introduced through apertures 6 and 7 provided in the walls 3 and 4 and in the disc 5 respectively. The spindle 8 can be driven by means of a motor, so that the disc 5 can be made to rotate without slip relative to the spindle 8. The recording medium in the shape of, for example, a disc may consist of any suitable plastics material, such as plastics film made of polyester, ABS, polycarbonate or polyvinyl chloride, or some other suitable material. The flexible or rigid recording medium is usually of circular shape and may be provided with magnetizable coatings and/or with one or several grooved tracks on one or both sides. The container 2 may consist of just one suitable material or may be made of different materials. As may be seen from the detail of the container shown in cross-section in FIG. 1a, the lower and/or upper walls 3 and 4 may also consist of relatively rigid sheets connected by sufficiently wide strips of film 9 to enable the distance between the inner surfaces 10 and 11 to be increased, which surfaces may be provided with cleaning layers if desired.

Vacuum platens 12 and 13 with apertures 14 (cf. FIG. 1) are arranged on each side of the container 2. The chambers 15 and 16 communicate with a vacuum pump 18 via pipes 17. The vacuum platen 12 is advantageously movable (double arrow A), so that the container 2 may be placed upon the spindle 8. It is also possible for both vacuum platens 12 and 13 to be mounted in such a way as to be movable relative to the container 2. When the vacuum pump 18 is switched on, the vacuum which is created draws the container walls 3 and 4 apart, so that the distance between the inner surfaces 10 and 11 increases. The apertures 14 should be so arranged and designed that the vacuum cannot affect the interior of the container 2. If necessary, an air supply line may lead to the container interior, in order to stabilize the recording medium 5 at very high speeds.

Locking means for the container 2 have not been shown in any of the illustrated embodiments. They are necessary, however, in order to fix the position of the recording medium 5 in relation to at least one movable scanning element, for example a flying magnetic head. These locking means may be of any desired suitable design.

Figure 2:
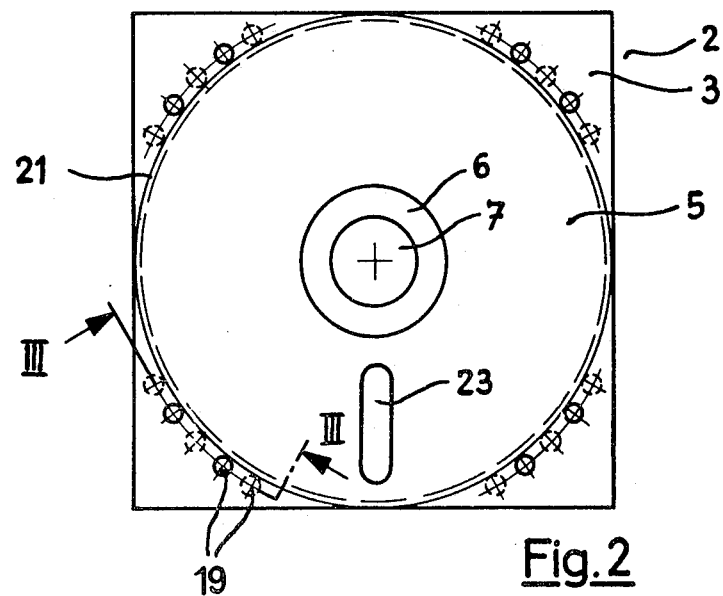

In the case of a container according to FIG. 2, having relatively rigid walls 3 and 4, it is also possible to lock only one of the walls 3 or 4 on the drive unit and to movably locate one of the suction platens 12 or 13, in order to increase the volume of the container 2 when mounted on the drive unit 1 for operation.

The container 2 shown in FIG. 1 may consist of just one elastic plastics material, so that all parts of the container can expand and retract.

FIG. 2 is a plan view of a square container 2, mounted on a drive unit provided with pins 19. The pins 19 engage entry apertures 20 in the container walls 3 and 4 in those regions of the container 2 which are situated outside the periphery 21 of the disc 5. The arrangement of pins 19 can be seen from FIG. 3. When the container 2 is in the operating position, the pins 19 which enter the container through the apertures 20 in the container walls 3 and 4 bear with their ends 22 against the opposite inner surfaces 11 and 10 respectively. In FIG. 3 the inner walls of the container are provided with cleaning layers. The directions in which the pins 19 enter are indicated by arrows a and b. The number of pins 19 used depends on the flexibility of the container walls 3 and 4. However, the pins 19 should be arranged symmetrically with respect to the apertures 6 and 7 in the container walls and in the disc 5 respectively. It is also possible to rigidly attach the group of pins for one side of the container to the drive unit and to arrange the other group on a movable device, so that the second group can only enter the container after the container 2 has been placed upon the first group of pins.

In FIG. 2, a radial elongated slot 23 is provided in the container wall 3, which allows one or more elements, for example a flying magnetic head, to scan the disc surface. An aperture in the same position is provided in the other container wall 4. Furthermore, expanding means for the container walls 3 and 4 may also be attached to the container itself. In an embodiment which is a little more difficult to handle, these expanding means are in the form of a threaded bush and a screw with threaded bush, each mounted on one of the inner container surfaces. The head of the screw must be accessible from without through an aperture in the container wall. In another embodiment which is easier to manufacture and handle, the expanding means may be in the form of conical springs, the ends of which are fastened to the container walls. The expanding means may also consist of a resilient or collapsible element 24 linking the comparatively rigid container walls 3 and 4 along their edges (cf. FIG. 4). This element 24 is attached to the container walls 3 and 4 in a dustproof manner. The container can be made ready for transportation by slipping suitable clips over its walls. When the container is to be placed on the drive unit for operation, the clips are removed, so that suitably dimensioned springs, in the relaxed state, set up a predetermined distance between the inner container surfaces. Any other form of suitable expanding means can be used on the container itself, particularly those which enable the container to be manufactured in a simple and economic manner.

If the walls of the container 3 and 4 are square, the expanding means are preferably arranged in the corner regions thereof.

Figure 5:
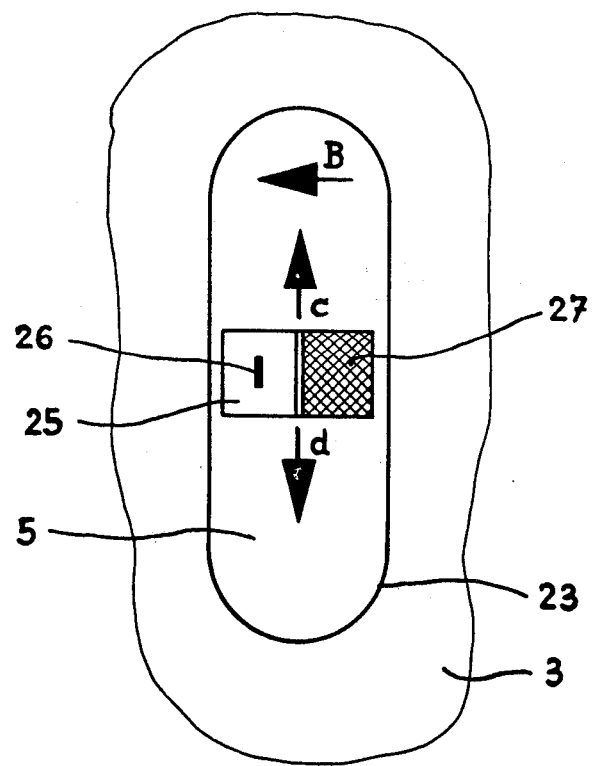

FIG. 5 shows a detail of the container 2 with slot 23. The arrow B indicates the direction of rotation of the disc 5. Within the slot 23 a magnetic scanning head 25 with gap 26 can be recognized which, during recording and playback, can be moved in the direction of arrows c and d within the confines of the slot 23 by means associated with the drive unit and not shown here. When viewed in the direction of arrow B, the scanning head 25 is preceded by a cleaning element 27, mounted either on the head-transporting means or directly on the head. In this way continuous cleaning of the tracks prior to scanning is ensured, making additional cleaning layers such as are shown in FIGS. 1 and 3 superfluous.

This cleaning element may consist of felt, foam or any other suitable material. Since the cleaning element is mounted on the drive unit, it can be readily cleaned from time to time.

We claim:

1. A container for a disc-shaped magnetic recording medium, for use with a drive unit comprising means for driving and means for scanning said recording medium in the recording and/or playback of electrical signals while said recording medium is enclosed by said container;

said container having apertures for admitting said driving means and said scanning means for cooperation with said recording medium; being flexible in a direction generally perpendicular to said recording medium; and having two mutually facing walls, inner surfaces of which are normally spaced from each other, at least in parts, by a distance smaller than the thickness of the recording medium so as to normally engage the two sides, respectively, of said recording medium; and there being provided expanding means for urging said walls, while the container and the recording medium therein are in a position on said drive unit, apart by a distance sufficient to release the recording medium from engagement by said inner surfaces of the walls.

2. A container as claimed in claim 1 wherein said walls are substantially rigid, and wherein said container comprises flexible portions interconnecting said walls.

3. A container as claimed in claim 1 wherein cleaning layers are provided on the inner surfaces of the container walls.

4. A container as claimed in claim 1 wherein said container is of rectangular shape and has corner regions extending substantially beyond the periphery of said recording medium.

5. A container as claimed in claim 4 wherein said expanding means for urging said walls apart are a part of said container and are disposed between the container walls in said corner regions.

6. A drive unit for use with a container as claimed in claim 1 wherein said expanding means are a part of said drive unit and include vacuum platens in contact with the walls of the container when said container is in position on said drive unit, said vacuum platens applying a suction force on said walls so as to increase the distance therebetween.

7. A drive unit for use with a container, as claimed in claim 1, wherein said expanding means are a part of said drive unit, and wherein said drive unit also comprises a cleaning element admitted into said container through the aperture provided therein for said scanning means, said cleaning element preceding said scanning means if viewed in the direction of rotation of the recording medium.

8. A drive unit for use with a container as claimed in claim 4, wherein said expanding means are a part of said drive unit and include movable pins disposed opposite corresponding openings in said corner regions of the container, said pins, while the container and the recording medium therein are in position on said drive unit, entering the interior of the container through said openings and with their ends bearing on the inner surfaces of the container wall opposite the entry opening so that said container walls are urged apart by said pins.

9. A container for a disc-shaped magnetic recording medium, for use with a drive unit comprising means for driving and means for scanning said recording medium in the recording and/or playback of electric signals while said recording medium is enclosed by said container; said container having apertures for admitting said driving means and said scanning means for cooperation with said recording medium; being flexible in a direction generally perpendicular to said recording medium; and having two mutually facing walls, the inner surfaces of said walls being provided with cleaning layers which, while said container and the recording medium therein are detached from said drive unit and also during a first mode of operation of said recording medium by said driving means, are spaced from each other, at least in parts, by a distance smaller than the thickness of the recording medium so as to normally engage the two sides, respectively, of said recording medium; and there being provided expanding means for urging said walls apart, during a second mode of operation of said recording medium by said driving means, by a distance sufficiently great to release the recording medium from contact by said cleaning layers, thereby to enable said recording medium to rotate at a considerably greater speed as compared with said first mode of operation.

* * * * *